June 15, 1948.  F. C. HARRIS  2,443,387
ELECTRIFIED CONVEYER
Filed Dec. 22, 1944  3 Sheets-Sheet 1
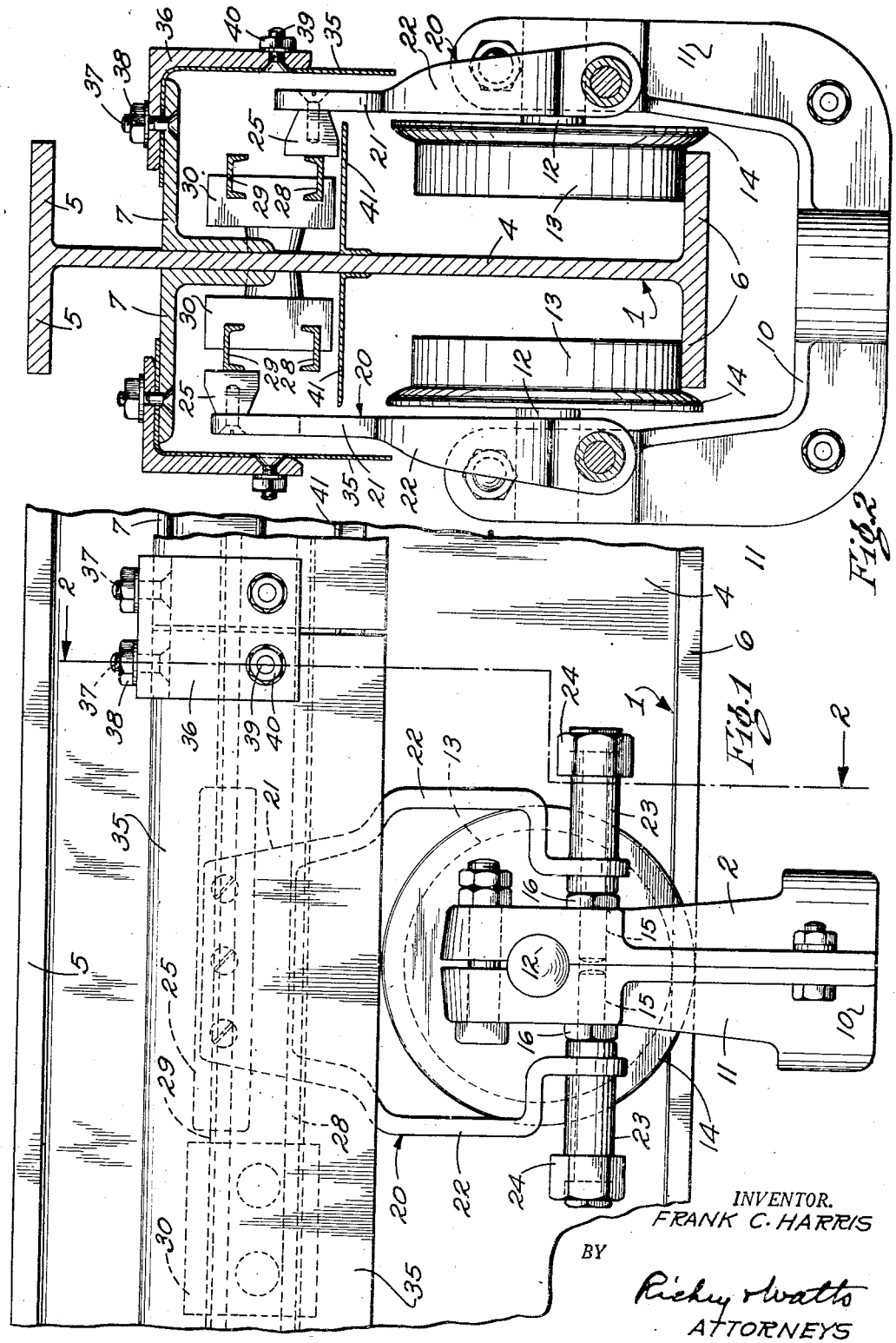
INVENTOR.
FRANK C. HARRIS
BY
Richey Watts
ATTORNEYS

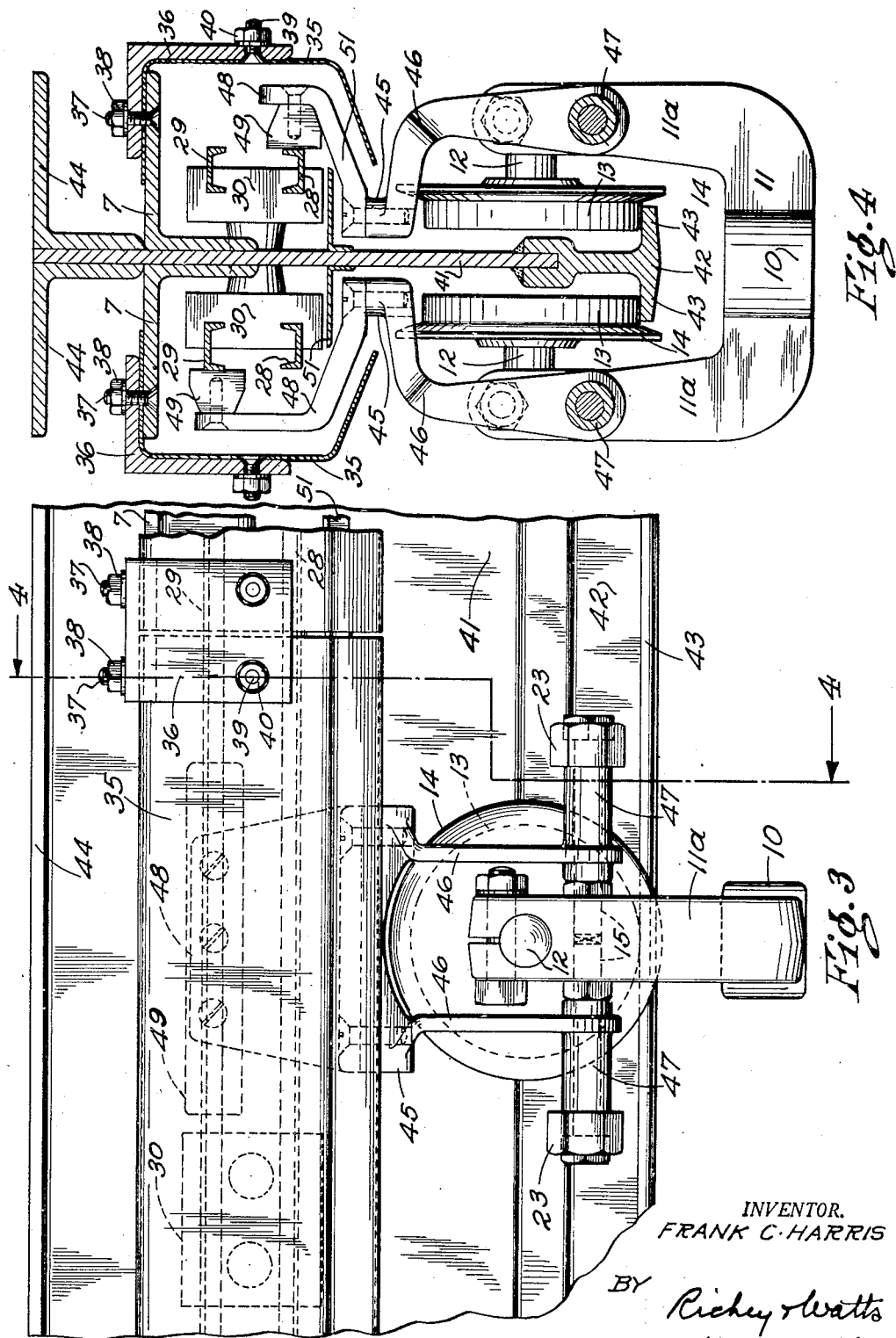

June 15, 1948.　　　　F. C. HARRIS　　　　2,443,387
ELECTRIFIED CONVEYER
Filed Dec. 22, 1944　　　　　　　　　　　3 Sheets-Sheet 3
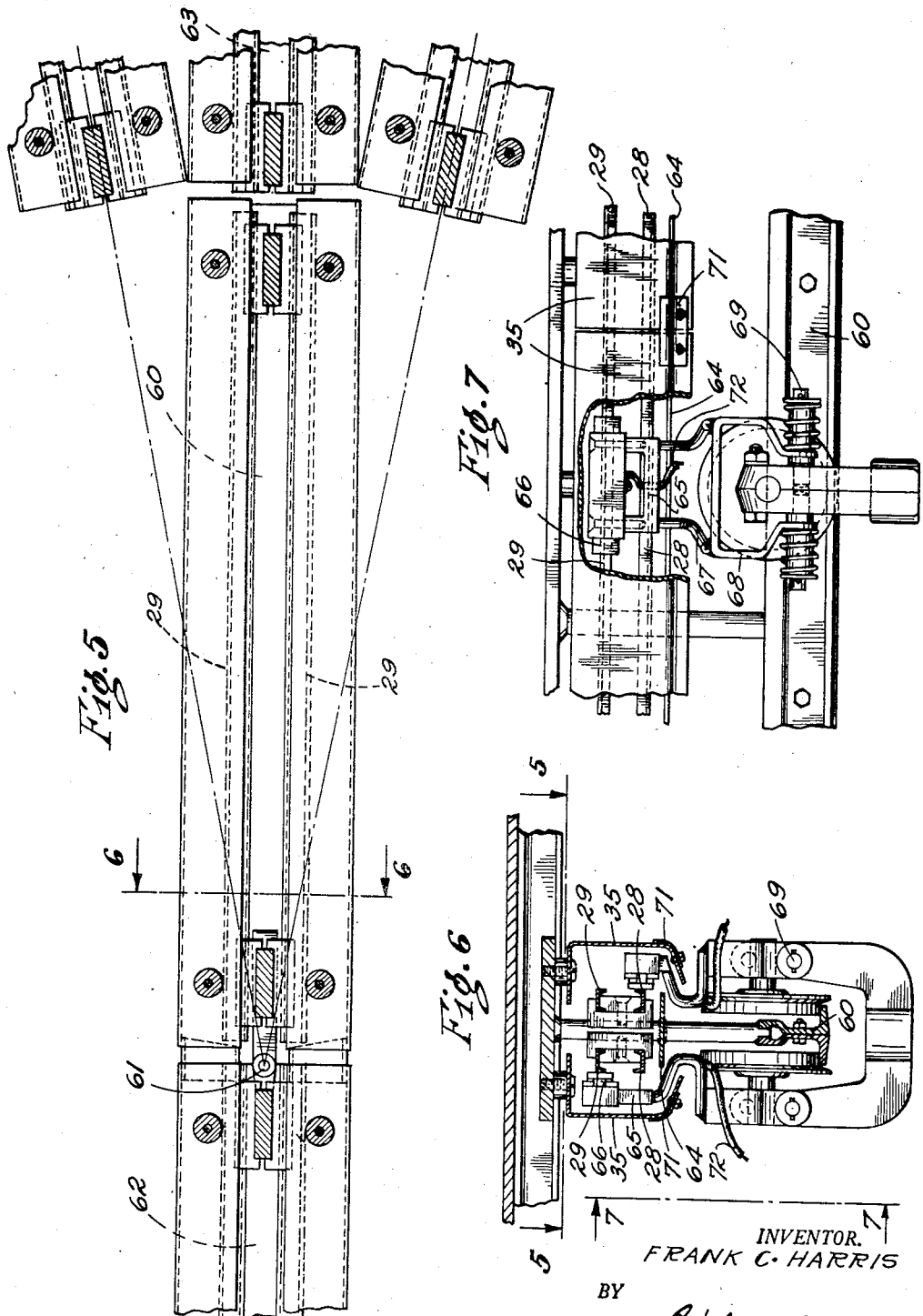
INVENTOR.
FRANK C. HARRIS
BY
Richey & Watts
ATTORNEYS Patented June 15, 1948

2,443,387

UNITED STATES PATENT OFFICE 2,443,387

ELECTRIFIED CONVEYER

Frank C. Harris, Bay Village, Ohio, assignor to The American MonoRail Company, Cleveland, Ohio, a corporation of Ohio Application December 22, 1944, Serial No. 569,313

2 Claims. (Cl. 191—23)

The present invention relates generally to overhead conveyors and particularly to electrified monorail conveyors in which the current carrying bus bars are shielded against contact with any object other than the current collectors.

Overhead monorail systems involve a number of different parts, including curved tracks, tongue and guide switches, turntables, lift sections and interlocks. Any satisfactory electrification for such a system includes current carrying bus bars and current collectors. The bus bars should have ample capacity to carry current sufficient for driving the trolleys, hoisting equipment, grabs and the many other electrical apparatuses associated with the system. The bus bars and collectors should be capable of constant, continuous, and heavy service and at high trolley speeds. The bus bars and collectors should be of such maximum dimensions as will permit their use thruout the entire system including its various above mentioned parts and should also be applicable to existing systems without necessitating alterations thereof. The bus bars should be of such construction that standard materials may be used and assembled with the usual dimensional tolerances and without the need for sensitive adjustment. The collectors should be capable of moving across gaps between adjacent ends of bus bars, as in switches and the like, and also of accommodating themselves to misalignments of the bus bars and maintaining contact with the bus bars during shimmying, jumping or swinging of the trolleys.

It is desirable that electrified overhead monorail systems should be shielded in such a way that they will not constitute a hazard to human life and that the collection of foreign material on the bus bars will be largely or entirely prevented.

Altho various proposals have been made heretofore for electrification of monorail conveyor systems and shielding such electrification, none of those proposals, so far as I know, has possessed all the foregoing requirements. Some of the proposed shielded electrifications could be applied only to monorail systems built around them; others could not be used in switches, turn-tables and the like; and still others could be applied only to a few existing monorail systems. The present invention makes it possible to construct simple, yet highly effective, shielded electrification for monorail conveyor systems embodying all those important requirements. The electrification and shielding of this invention is applicable to many existing conveyor systems without material change thereof, is readily applicable to switches, turn-tables, lifts and the like without provision of additional space, and standard materials may be used with the usual tolerances in construction, spacing and alignment.

In other words, this invention provides an electrified and shielded overhead conveyor system which is of general, if not universal, application, is inexpensive to construct and maintain, and virtually, if not actually, proof against injury to workmen traceable to accidental contact with the current carrying bus bars of the system.

The present invention will be better understood by those skilled in the art from the following description and the drawing which accompany and form a part of this specification and in which Figure 1 is a fragmentary, side elevational view of one form of apparatus embodying the present invention;

Figure 2 is a cross-sectional view taken on line 2—2 of Fig. 1;

Figure 3 is a fragmentary, side elevational view similar to Fig. 1 of a modified adaptation of the present invention;

Figure 4 is a cross-sectional view taken in line 4—4 of Fig. 3.

Fig. 5 is a top plan view of a tongue switch embodying another modification of the present invention.

Fig. 6 is a vertical sectional view taken on line 6—6 of Fig. 5; and,

Fig. 7 is a fragmentary, side elevational view of the apparatus of Fig. 5, partly broken away.

The apparatus shown in Figs. 1 and 2 comprises a rail 1, a current collecting trolley designated as an entirety by numeral 2 and a bus bar shield 3.

The rail 1 is of the I-beam type and comprises a web 4 having top flanges 5 to be attached to an overhead support and outwardly extending flanges 6 at its lower edge to serve as tracks for the trolley wheels. Angle brackets 7 are secured to rail web 4 well above flanges 6 for a purpose presently to be described.

The trolley assembly 2 comprises a yoke, wheels and current collectors. The yoke 10 extends beneath flanges 6 and includes arms 11 extending upwardly therefrom past the sides of flanges 6. Axles 12 are secured in arms 11 near their upper ends and wheels 13 are rotatably mounted on axles 12 and are positioned to run on flanges 6 with the wheel flanges 14 being spaced a short distance from the adjacent edges of flanges 6. It will be understood that wheels of different diamescribed, the wheels 13 being the larger of these sizes. Each arm 11 carries rods 15 extending fore and aft thereof and parallel to and preferably at a higher elevation than flanges 6. These rods 15 may be screw-threaded into arms 11 and locked in position by nuts 16. If desired, the rods 15 may be replaced by a single rod which extends freely thru arm 11 and is prevented from rotating as by nuts 16 or in any other suitable manner.

Current collectors are pivotally mounted on pivot means 15. Each current collector of Figs. 1 and 2 comprises a member which is disposed centrally of an arm 11 or symmetrically with respect thereto. This member 20 comprises a shoe-carrying body 21 extending parallel to rail web 4 and legs 21 extending from the ends of body 20 downwardly on the fore and aft sides of arm 11 where they join sleeves 23 which are turnably mounted on pivot means 15. Pivot means 15 have headed outer ends which seat in recesses in nuts 24. These nuts 24 cooperate with spring means (not shown) and legs 22 to urge body 20 toward web 4 of rail 1. Each body 20 carries a current collecting shoe 25 which slidably engages against a bus bar 28 or 29. It will be understood that the current collectors 20 for bars 29 are like but enough shorter vertically than the collectors for bars 28 for the shoes to engage bars 29. The bus bars 28 and 29 just mentioned are mounted in insulating blocks 30 which in turn are secured to opposite sides of web 4 of rail 1.

It will be understood that current conducting wires (not shown) may be connected to shoes 25 and carried along legs 21 and thence to a motor (not shown).

Thin metal shielding sheets 35 extend along rail 1 and are supported by angle brackets 7. Each sheet 35 is bent to extend outwardly on brackets 7 over the bus bars and downwardly past the bars to a point below the lower bus bar 28. Splices 36 span the space between the adjacent ends of sheets 35. Bolts 37 which extend upwardly thru angle brackets 7, sheets 35 and splices 36, and nuts 38 serve to hold these several parts in assembled position. Bolts 39 which extend thru the sides of sheets 35 and splices 36 and nuts 40 serve to hold these parts in assembled position. Guards 41, carried by the rail 1, extend outwardly beneath the lower bus bars to beyond the vertical edges of bars 28 and 29. Shields 35 and 41 define spaces for collectors 20 and cooperate to prevent engagement with the bus bars of any object, such as a metal rod, accidentally inserted into those spaces.

From the foregoing description and Figs. 1 and 2 it will be understood that the current collectors are centrally or symmetrically mounted on the yoke fore and aft, take up very little fore and aft space and lie between the vertical planes of the outer sides of the yoke. For these reasons the pressure of the shoe of each current collector which is taken by the yoke does not tend to turn the latter or laterally bend the pivot rods, the pressure against the adjacent bus bar may be regulated initially and will not vary appreciably even when the trolley is going around curves, and the dimensions of the collector are such that it will not interfere with the shortest curves, whether they be inside or outside curves, or with parts of switches. The shielding can be applied to existing installations and does not require changes in the dimensions of such installations for the shielding, as well as the collectors, are within the normal width of the trolley yokes.

It will also be understood that the bus bars are shielded against the possibility of being contacted by the parts of a workman's body or by a metal object in his hands. The sheets 35 prevent such access to the bus bars vertically from above and below and horizontally from the side.

If desired, the top portion of shielding sheets 35 may be extended into virtual contact with web 4 of the rail, thereby preventing ingress of foreign material into the top of the space occupied by the bus bars where it could collect on the bus bars.

In Figs. 3 and 4 the rail 40 is of a built-up type and includes a plate 41 serving as a web of the rail, a section 42 secured to the lower edge of plate 41 and having outwardly extending flanges 43 at its lower end to form wheel rails and angles 44 at its upper end for attachment to an overhead beam or other suitable supporting structure (not shown).

Each current collector comprises a body 45 disposed a short distance directly above the tread of a wheel 13 and the leg 46 extends outwardly from the ends of the body 45 past the flanges of the wheel, then toward each other and then downwardly parallel on the fore and aft sides of the arms 11a of yoke 11 to sleeves 47. By this arrangement the parts of body 20 are supported above the wheel treads for limited pivoting movement toward and away from the rail and legs 21a remain out of contact with the wheel flanges.

The sleeves 47 cooperate with pivot means 15 and a spring (not shown) in the manner above described in connection with Figs. 1 and 2. Each body 45 carries a bracket 48 which extends outwardly beyond bus bars 28 and 29 and then upwardly and carries a collector shoe 49 to engage one of those bars.

As in Figs. 1 and 2, the bus bars are well shielded and the device is compact and possesses all the other advantages of the apparatuses of Figs. 1 and 2. However, the shielding in Figs. 3 and 4 comprises shield sheets 50 like shields 35 of Figs. 1 and 2 except that at their lower edges they are bent inwardly into the V-shaped space between legs 46 and bracket 48; and guards 51 like guards 41 of Figs. 1 and 2 except that they are shorter horizontally.

One important advantage of the above described apparatus which has not been especially emphasized hereinabove is that it permits the use of a trolley consisting of two yokes and a load bar of varying lengths connecting the yokes. When current collectors are mounted between two such yokes and the trolley is going around a curve, the pressure of the current collecting shoe against the bus bars will vary considerably. When the collectors are on the inside of a curve their supports will move away from vertical lines dropped from the bus bars, thus lessening the pressure of the shoes on the bars or even breaking contact between the shoes and bars; and when the collectors are moving around the outside of the curve the pressure will increase because the collector supports will move toward vertical lines dropped from the bus bars and thus increase the pressure of the shoes on the bars. Furthermore, when collectors are mounted between trolleys on a load bar the shielding on inside curves must be moved outwardly on such curves to accommodate the outward movement of the collectors. In the present construction, where the collectors are disposed centrally with respect to the yoke, they maintain the same position relative to the bus bars while moving along straight track and also around both inside and outside curves.

In Figs. 5, 6 and 7 the present invention is shown in a modified form as applied to a tongue switch. As Fig. 5 shows, a section of track 60 is connected by hinge 61 to a fixed track 62 and may be swung into alignment with any one of the three opposed fixed tracks 63. Tracks 60, 62 and 63 may be like the tracks shown in Figs. 1 to 4 but, as shown, comprise vertically short rails suspended from overhead supports by rods or straps 64 located at intervals along the rails leaving spaces therebetween. These tracks are equipped with bus bars 28 and 29 and shields 35. A guard 64 is positioned below the lower bus bars 28 and above the inwardly projecting parts of shields 35 to prevent any article, such as a metal rod, from being inserted into the opening between the bottom ends of the shields 35 and coming into contact with any of the bus bars. The trolley is like those of Figs. 1 to 4 and the current collectors resemble those of Figs. 3 and 4. Each of these collectors comprises a body 65 which pivotally carries a collector shoe 66 and is connected by rods 67 to legs 68 which pivot on pins 15. Springs 70 on pins 69 press legs 68 and body 65 toward the bus bars. Similar springs may be used with the collectors of Figs. 1 to 4. The adjacent ends of shields 35 may be connected by splices 71. Current from shoes 66 may be conducted thru cable 72 to a motor (not shown). As Fig. 5 indicates, the present shielded electrification can be applied to an existing tongue switch without any change being made in the dimensions of the switch. It can be applied equally well to glide switches, turn-tables, lifts and the like without changes in their dimensions.

Having thus described the invention so that others skilled in the art may be able to understand and practice the same, I state that what I desire to secure by Letters Patent is defined in what is claimed.

What is claimed is:

1. In an overhead conveyor comprising a rail having outwardly extending flanges near its lower edge, a current conductor bus bar fixed in position parallel to the rail above one of said flanges, a trolley yoke extending transversely beneath the rail and having arms extending up past said flanges, wheel shafts in the upper ends of said arms and wheels on said shaft to run on said flanges, the combination of a current collector carried by said yoke and spring means urging said collector toward said bus bar, said collector comprising a shoe slidable along said bus bar, a body carrying said shoe and disposed substantially symmetrically with respect to the vertical plane of the axis of the adjacent wheel, and legs connecting said body to said yoke, said legs being pivotally connected at their lower ends to the fore and aft sides of the adjacent yoke arm close to the outer side of the adjacent wheel, said legs extending fore and aft respectively to near the ends of the horizontal diameter of said wheel and then extending upwardly and being connected to said body, the horizontal spacing of said upwardly extending parts of the legs permitting swinging movement of parts of said legs in the vertical plane of, and above the wheel.

2. In an overhead conveyor comprising a rail having outwardly extending flanges near its lower edge, a current conductor bus bar fixed in position parallel to the rail above one of said flanges, a trolley yoke extending transversely beneath the rail and having arms extending up past said flanges, wheel shafts in the upper ends of said arms and wheels on said shafts to run on said flanges, the combination of a current collector carried by said yoke, spring means urging said collector toward said bus bar, and means for shielding said bus bar, said collector comprising a shoe slidable along said bus bar, a body carrying said shoe and disposed substantially symmetrically with respect to the vertical plane of the axis of the adjacent wheels, and legs connecting said body to said yoke, said legs being pivotally connected at their lower ends to the fore and aft sides of the adjacent yoke arm close to the outer side of the adjacent wheel, said legs extending fore and aft respectively to substantially the ends of the horizontal diameter of said wheel and then extending upwardly and being connected to said body, horizontal spacing of said upwardly extending parts of the legs permitting swinging movement of parts of said legs in the vertical plane of, and above the wheel, said shielding means including a top shield extending outwardly over the top and down past the outer side of said bar to below the bar and a bottom shield extending from the rail beneath and closely adjacent to said bar, the free edges of said top and bottom shields being separated from each other to provide a space in which the said legs may move toward and away from said rail while the collector shoe follows the bus bar.

FRANK C. HARRIS.

REFERENCES CITED

The following references are of record in the file of this patent:

UNITED STATES PATENTS

| Number | Name | Date |
| --- | --- | --- |
| 610,007 | Walkins | Aug. 30, 1898 |
| 1,466,893 | Dunbar | Sept. 4, 1923 |
| 2,137,694 | McCain | Nov. 22, 1938 |
| 2,306,885 | Klemm et al. | Dec. 29, 1942 |
| 2,331,860 | Stevens | Oct. 12, 1943 |